(12) United States Patent
Gonze et al.

(10) Patent No.: US 8,745,970 B2
(45) Date of Patent: Jun. 10, 2014

(54) AMMONIA SLIP CATALYST DIAGNOSTIC METHODS AND SYSTEMS

(75) Inventors: Eugene V. Gonze, Pinckney, MI (US); Michael J. Paratore, Jr., Howell, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 457 days.

(21) Appl. No.: 12/768,091

(22) Filed: Apr. 27, 2010

(65) Prior Publication Data

US 2011/0258992 A1 Oct. 27, 2011

(51) Int. Cl.
*F01N 3/00* (2006.01)

(52) U.S. Cl.
USPC .............. 60/295; 60/301; 60/274; 60/286

(58) Field of Classification Search
USPC .............. 60/277, 286, 295, 285, 301, 311
See application file for complete search history.

(56) References Cited

U.S. PATENT DOCUMENTS

| | | | | |
|---|---|---|---|---|
| 3,882,451 A * | 5/1975 | Fujishiro et al. | ............. | 340/449 |
| 5,592,815 A * | 1/1997 | Jelden et al. | ................... | 60/274 |
| 5,706,652 A * | 1/1998 | Sultan | ............................. | 60/274 |
| 6,158,212 A * | 12/2000 | Tanaka | ............................ | 60/277 |
| 6,883,307 B2 * | 4/2005 | Iihoshi et al. | .................. | 60/277 |
| 2007/0125073 A1* | 6/2007 | Reuter | .......................... | 60/286 |
| 2007/0289287 A1* | 12/2007 | Tahara et al. | .................. | 60/277 |
| 2008/0022664 A1* | 1/2008 | Reuter et al. | ................... | 60/286 |
| 2008/0202107 A1 | 8/2008 | Boorse et al. | | |
| 2009/0272104 A1* | 11/2009 | Garimella et al. | ............. | 60/287 |
| 2010/0175372 A1* | 7/2010 | Lambert et al. | ................ | 60/297 |

FOREIGN PATENT DOCUMENTS

DE 2346425 4/1974
WO WO 2007008121 A1 * 1/2007

OTHER PUBLICATIONS

Bosch: Kraftfahrtechnisches Handbuch. 25. Auflage. Wiesbaden : Friedr. Vieweg & Sohn Verlag, 2003 S. 582 bis 584.—ISBN 3-528-23876-3.
Verordnung Nr. 595/2009 des europaischen Parlaments und des Rates. Jul. 18, 2009, Amtsblatt der Europaischen Union [online].

\* cited by examiner

*Primary Examiner* — Thomas Denion
*Assistant Examiner* — Patrick Maines
(74) *Attorney, Agent, or Firm* — Cantor Colburn LLP

(57) ABSTRACT

A method of diagnosing an ammonia slip catalyst device is provided. The method includes: computing a delta between a first temperature and a second temperature; evaluating the delta based on an efficiency threshold; and generating a fault notification based on the evaluating.

14 Claims, 3 Drawing Sheets

AMMONIA SLIP CATALYST DIAGNOSTIC METHODS AND SYSTEMS

FIELD OF THE INVENTION

Exemplary embodiments of the present invention relate to diagnosing methods and systems and, more specifically, to diagnosing methods and systems for ammonia slip catalysts.

BACKGROUND

Exhaust gas emitted from an internal combustion (IC) engine, is a heterogeneous mixture that may contain gaseous emissions such as carbon monoxide (CO), unburned hydrocarbons (HC) and oxides of nitrogen (NOx) as well as condensed phase materials (liquids and solids) that constitute particulate matter. Catalyst compositions typically disposed on catalyst supports or substrates are provided in an IC engine exhaust system to convert certain, or all of these exhaust constituents into non-regulated exhaust gas components.

In some cases, selective catalytic reductant (SCR) devices are provided to reduce the amount of NOx in the exhaust. The SCR devices make use of ammonia ($NH_3$) to reduce the NOx. For example, when the proper amount of ammonia is available at the SCR device under the proper conditions, the ammonia reacts with the NOx in the presence of an SCR catalyst to reduce the NOx emissions. However, if the reduction reaction rate is too slow, or if there is excess ammonia in the exhaust, ammonia can slip out the exhaust pipe. An ammonia slip catalyst device (ASC) is provided to prevent the slip of ammonia through the exhaust pipe to the atmosphere. Accordingly, it is desirable to diagnose the ASC to ensure operability and to prevent the slip of ammonia to the atmosphere.

SUMMARY OF THE INVENTION

In one exemplary embodiment, a method of diagnosing an ammonia slip catalyst device is provided. The method includes: computing a delta between a first temperature and a second temperature; evaluating the delta based on an efficiency threshold; and generating a fault notification based on the evaluating.

The above features and advantages and other features and advantages of the present invention are readily apparent from the following detailed description of the invention when taken in connection with the accompanying drawings.

BRIEF DESCRIPTION OF THE DRAWINGS

Other objects, features, advantages and details appear, by way of example only, in the following detailed description of embodiments, the detailed description referring to the drawings in which.

DESCRIPTION OF THE EMBODIMENTS

Figure 1:
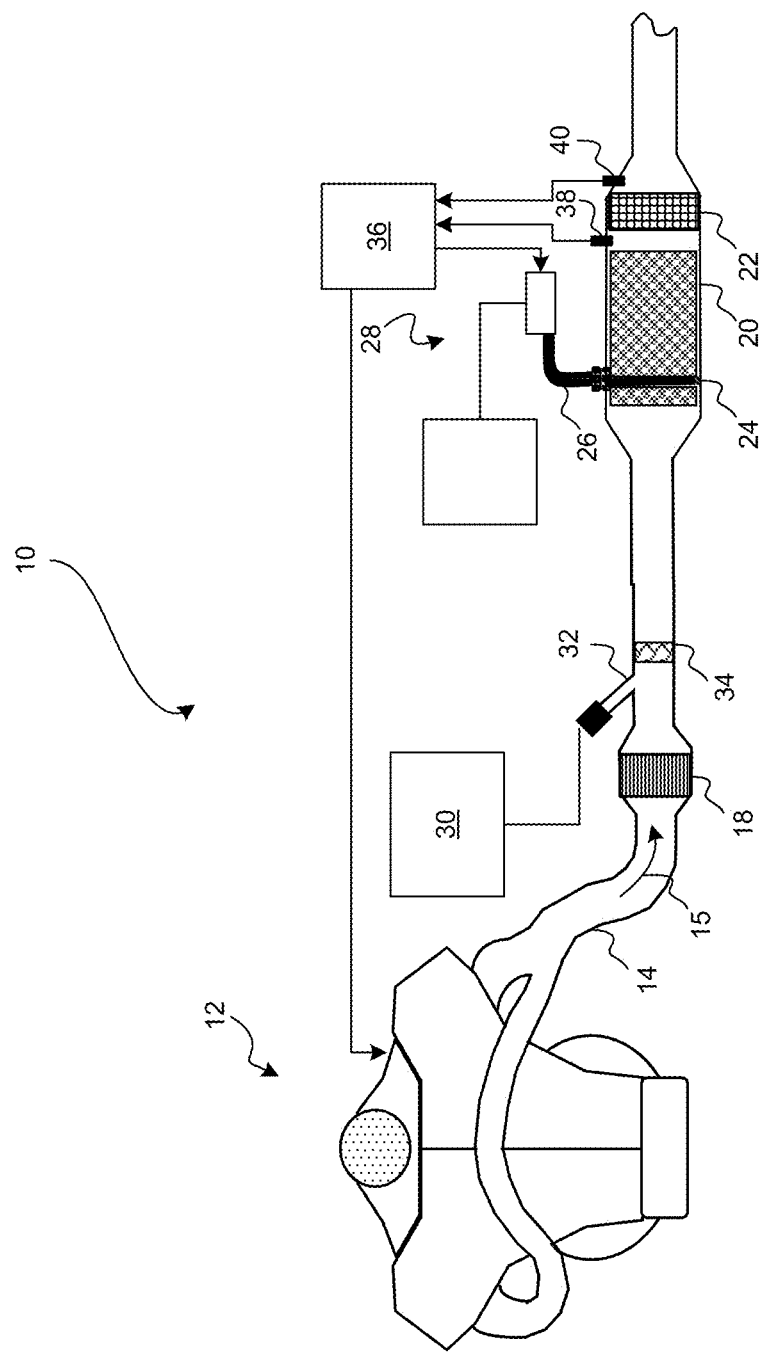
FIG. 1 is a schematic view of an exhaust system in accordance with an exemplary embodiment.

The following description is merely exemplary in nature and is not intended to limit the present disclosure, application or uses. It should be understood that throughout the drawings, corresponding reference numerals indicate like or corresponding parts and features. As used herein, the term module refers to an application specific integrated circuit (ASIC), an electronic circuit, a processor (shared, dedicated, or group) and memory that executes one or more software or firmware programs, a combinational logic circuit.

Referring now to FIG. 1, an exemplary embodiment is directed to an exhaust gas treatment system 10, for the reduction of regulated exhaust gas constituents of an internal combustion (IC) engine 12. The exhaust gas treatment system described herein can be implemented in various engine systems. Such engine systems may include, for example, but are not limited to diesel engine systems, gasoline direct injection systems, and homogeneous charge compression ignition engine systems.

The exhaust gas treatment system 10 generally includes one or more exhaust gas conduits 14, and one or more exhaust treatment devices. The exhaust treatment devices include, for example, an oxidation catalyst device (OC) 18, a two-way selective catalytic reduction and particulate filter device (SCR/PF) 20, and an ammonia slip catalyst device (ASC) 22. As can be appreciated, the exhaust gas treatment system 10 of the present disclosure may include various combinations of one or more of the exhaust treatment devices shown in FIG. 1, and/or other exhaust treatment devices (not shown) and is not limited to the present example.

In FIG. 1, the exhaust gas conduit 14, which may comprise several segments, transports exhaust gas 15 from the IC engine 12 to the various exhaust treatment devices of the exhaust gas treatment system 10. As can be appreciated, the OC 18 can be of various flow-through, oxidation catalyst devices known in the art. In various embodiments the OC 18 may include a flow-through metal or ceramic monolith substrate that is wrapped in an intumescent mat or other suitable support that expands when heated, securing and insulating the substrate. The substrate may be packaged in a stainless steel shell or canister having an inlet and an outlet in fluid communication with the exhaust gas conduit 14. The substrate can include an oxidation catalyst compound disposed thereon. The oxidation catalyst compound may be applied as a wash coat and may contain platinum group metals such as platinum (Pt), palladium (Pd), rhodium (Rh) or other suitable oxidizing catalysts, or combination thereof. The OC 18 is useful in treating unburned gaseous and non-volatile HC and CO, which are oxidized to form carbon dioxide and water.

The SCR/PF 20 may be disposed downstream of the OC 18. The SCR/PF 20 operates to filter the exhaust gas 15 of carbon and other particulates as well as to reduce NOx constituents in the exhaust gas. As can be appreciated, the SCR/PF 20 can be constructed of various particulate filters known in the art. In various embodiments, the SCR/PF 20 may be constructed using a wall flow monolith filter or other devices, such as, for example, wound or packed fiber filters, open cell foams, sintered metal fibers, etc.

For regeneration purposes, the SCR/PF 20 includes an electrically heated device (EHD) 24 that operates to generate the high temperatures needed for regeneration of the SCR/PF 20. In various embodiments, the EHD 24 heats exhaust gas 15 passing through the filter and/or heats areas of the filter itself. The EHD 24 may be constructed of any suitable material that is electrically conductive such as a wound or stacked metal monolith. An electrical conduit 26 connects to an electrical system, such as a vehicle electrical system 28, and supplies electricity to the EHD 24 to thereby heat the device. In various embodiments, an oxidation catalyst compound (not shown) may be applied to the EHD 24 as a wash coat and may contain platinum group metals such as platinum (Pt), palladium (Pd), rhodium (Rh) or other suitable oxidizing catalysts, or combination thereof.

In various embodiments, the SCR/PF 20 includes an SCR catalyst composition applied to the filter. The SCR catalyst composition can contain a zeolite and one or more base metal components such as iron (Fe), cobalt (Co), copper (Cu) or vanadium which can operate efficiently to convert NOx constituents in the exhaust gas 15 in the presence of a reductant, such as, ammonia ($NH_3$). An $NH_3$ reductant may be supplied from a reductant supply source 30 and may be injected into the exhaust gas conduit 14 at a location upstream of the SCR/PF 20 using an injector 32, or other suitable method of delivery of the reductant to the exhaust gas 15. The reductant may be in the form of a gas, a liquid, or an aqueous urea solution and may be mixed with air in the injector 32 to aid in the dispersion of the injected spray. A mixer or turbulator 34 may also be disposed within the exhaust conduit 14 in close proximity to the injector 32 to further assist in thorough mixing of the reductant with the exhaust gas.

The ASC 22 is disposed downstream of the SCR/PF 20 and converts any $NH_3$ that is not consumed in the NOx reaction process. The ASC 22 can contain any of various catalysts configured to react with ammonia to produce mainly nitrogen. Generally, the ASC 22 is utilized to remove $NH_3$ that has slipped through or exited the SCR/PF 20 without reacting with NOx in the exhaust gas 15.

A control module 36 controls the IC engine 12 and the regeneration process based on sensed and/or modeled data. In various embodiments, the control module 36 further diagnoses the ASC 22 based on one or more sensed and/or modeled inputs and further based on the diagnostic methods and systems of the present disclosure. In one example, a first temperature sensor 38 senses a temperature of exhaust gas 15 that has passed through the SCR/PF 20 and generates a first temperature signal based thereon. A second temperature sensor 40 senses a temperature of exhaust gas 15 that has passed through the ASC 22 and generates a second temperature sensor signal based thereon. Generally speaking, the control module 36 receives the signals and diagnoses the ASC 22 based on a delta between the signal values.

In various embodiments, the control module 36 evaluates the delta just after regeneration occurs. As a result of the regeneration, a high temperature exhaust pulse of highly oxygenated carbon monoxide exits the SCR/PF 20. The temperature of the pulse can be sensed as the exhaust exits the SCR/PF 20. If the ASC 22 is working as intended, the pulse will generate an exothermic reaction within the ASC 22. The result of the exothermic reaction can be sensed as it exits the ASC 22.

Figure 2:
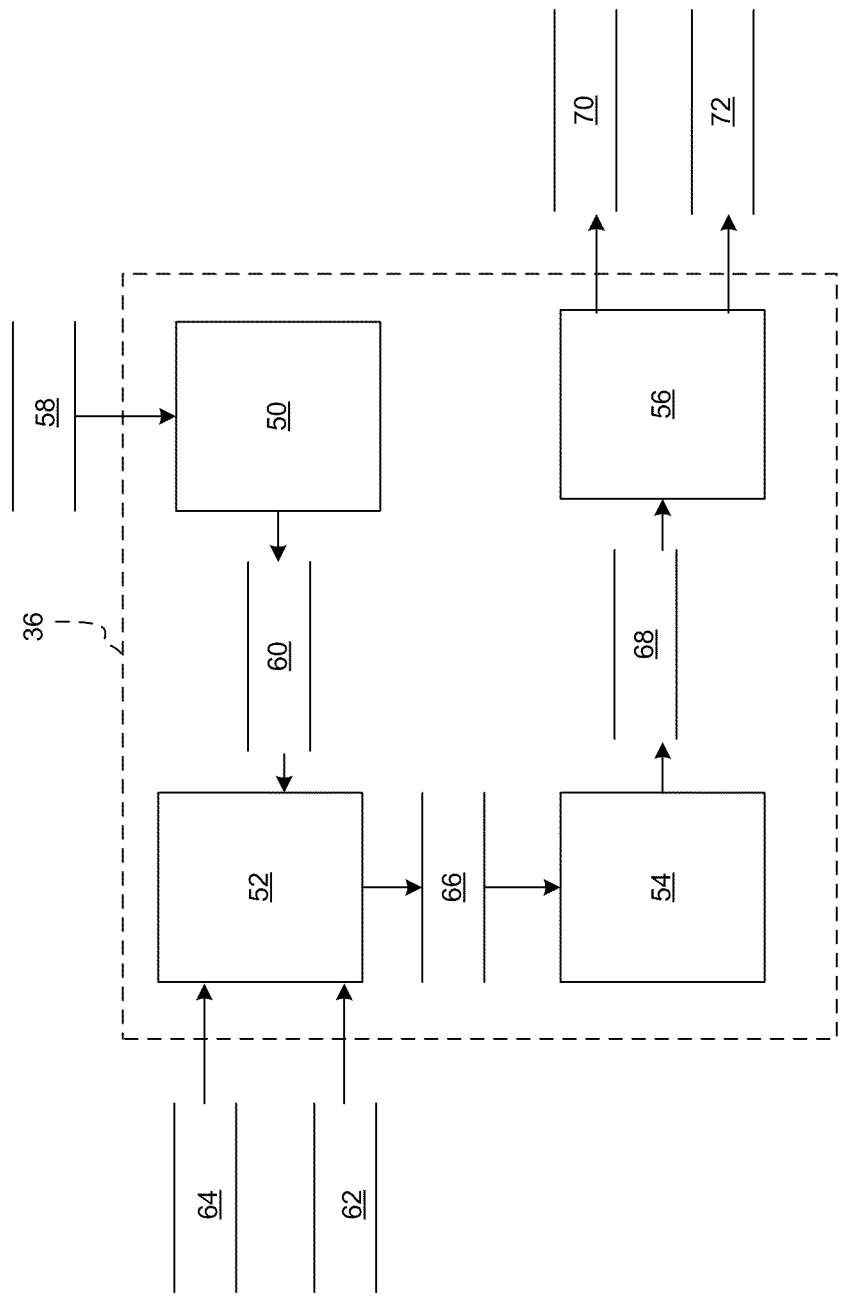
FIG. 2 is a dataflow diagram illustrating a diagnostic system in accordance with an exemplary embodiment.

Referring now to FIG. 2, a dataflow diagram illustrates various embodiments of a diagnostic system that may be embedded within the control module 36. Various embodiments of diagnostic systems according to the present disclosure may include any number of sub-modules embedded within the control module 36. As can be appreciated, the sub-modules shown in FIG. 2 may be combined and/or further partitioned to similarly diagnose the ASC 22 (FIG. 1). Inputs to the control module 36 may be sensed from the IC engine 12 (FIG. 1), received from other control modules (not shown), and/or determined/modeled by other sub-modules (not shown) within the control module 36. In various embodiments, the control module 36 includes a regeneration evaluation module 50, a temperature delta module 52, a delta evaluation module 54, and a notification module 56.

The regeneration evaluation module 50 receives as input information indicating that regeneration has begun, is currently occurring, and/or has occurred. The information can be any data that a status of regeneration can be derived from. In one example, the information can include heater control switch information. Based on the regeneration information, the regeneration evaluation module 50 determines a regeneration status 60.

The temperature delta module 52 receives as input the regeneration status 60, a post slip catalyst temperature 62, and a post particulate filter temperature 64. In various embodiments, the temperature values can be generated by the sensors (as shown in FIG. 1) or modeled. The temperature delta module 52 monitors the temperature values and computes a temperature delta 66 when the regeneration status indicates that the regeneration has occurred.

For example, the temperature delta module 52 computes the temperature delta 66 between the post slip catalyst temperature 62 and the post particulate filter temperature 64. In one example, the temperature delta module 52 computes the temperature delta 66 based on the following equation:

$$\Delta T = PSC_{temp} - PPF_{temp} \quad (1)$$

Where the symbol $\Delta T$ represents the temperature delta 66. The symbol $PSC_{temp}$ represents the post slip catalyst temperature 62. The symbol $PPF_{temp}$ represents the post particulate filter temperature 64.

The delta evaluation module 54 receives as input the temperature delta 66. Based on the temperature delta 66, the delta evaluation module 54 generates a fault status 68 indicating a diagnosis of the ASC 22 (FIG. 1). For example, if the temperature delta 66 is greater than an efficiency threshold, the fault status 68 is set to TRUE or TEST PASS. If the temperature delta 66 is less than the efficiency threshold, the failure flag is set to FALSE or TEST FAIL. In other words if the delta 66 is large, the pulse of exhaust after regeneration from the SCR/PF 20 (FIG. 1) has been oxidized, thus indicating that the ASC 22 (FIG. 1) is working as intended. If the delta 66 is small, the pulse of exhaust after regeneration from the SCR/PF 20 (FIG. 1) has not been oxidized, thus indicating that the ASC 22 (FIG. 1) is not working as intended.

The notification module 56 can set a diagnostic code 72 and/or generate a notification signal 70 based on the fault status 68. For example, if the fault status 68 indicates one or more faults for X consecutive times, for X consecutive seconds, or for X out of Y samples, the notification signal 70 may be generated. In various embodiments, the notification signal 70 may be an audio signal that activates an audio system (not shown) of a vehicle including the exhaust gas treatment system 10 (FIG. 1). In various other embodiments, the notification signal 70 may be an indicator signal that activates a warning lamp (not shown) of the vehicle. In various other embodiments, the notification signal 70 includes the appropriate diagnostic trouble code and can be retrieved by a service tool or transmitted to a remote location via a telematics system (not shown) of the vehicle.

Figure 3:
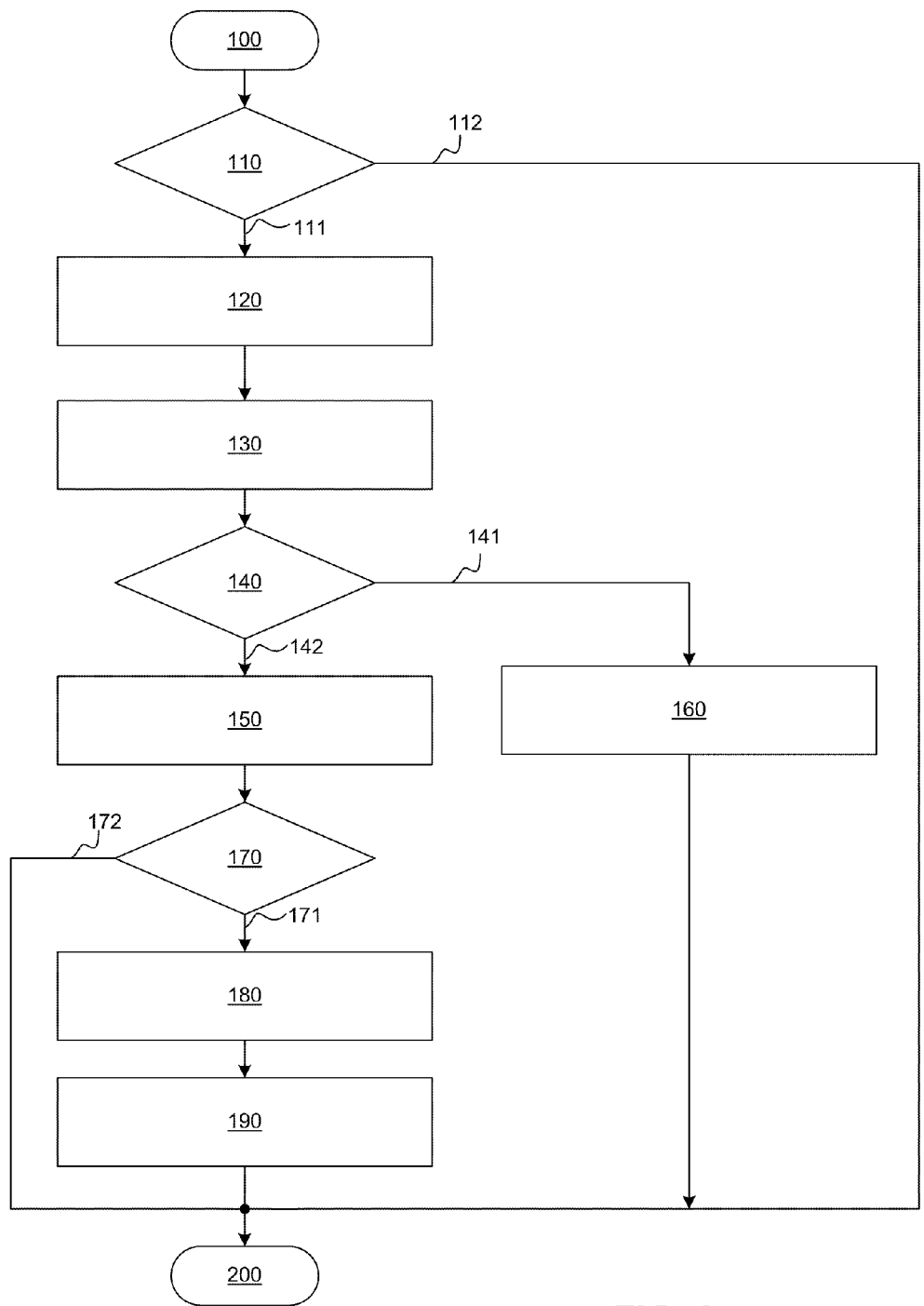
FIG. 3 is a flowchart illustrating a diagnostic method in accordance with an exemplary embodiment.

Referring now to FIG. 3, and with continued reference to FIGS. 1 and 2, a flowchart illustrates a diagnostic method that can be performed by the control module 36 of FIG. 1 in accordance with the present disclosure. As can be appreciated in light of the disclosure, the order of operation within the method is not limited to the sequential execution as illustrated in FIG. 3, but may be performed in one or more varying orders as applicable and in accordance with the present disclosure.

In various embodiments, the method can be scheduled to run based on predetermined events, and/or run continually during operation of the IC engine 12.

In one example, the method may begin at 100. The activity of regeneration is evaluated at 110. If regeneration is active at 111, the method continues at 120. However, if regeneration is not active at 112, the method may end at 200.

At 120, the post particulate filter temperature 64 and the post slip catalyst temperature 62 are received. The delta 66 between the post particulate filter temperature and the post slip catalyst temperature 62 is computed at 130 and evaluated at 140. If the delta 66 is less than an efficiency threshold at 142, the fault status 65 is set to indicate that the slip catalyst efficiency test has failed at 150. However, if the delta 66 is greater than or equal to the efficiency threshold at 141, the fault status 68 is set to indicate that the slip catalyst efficiency test has passed at 160 and the method may end at 200.

If, at 171 the slip catalyst efficiency test has failed, the number of failures is evaluated at 180. If the failure has occurred, for example, X number of times, X of Y times, or for X consecutive seconds, the diagnostic code 72 is set to indicate the failure at 180 and/or the notification signal 70 is generated at 190. Thereafter, the method may end at 200. Otherwise, at 172, the method may end at 200.

While the invention has been described with reference to exemplary embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiments disclosed as the best mode contemplated for carrying out this invention, but that the invention will include all embodiments falling within the scope of the present application.

What is claimed is:

1. A method of diagnosing an ammonia slip catalyst device, comprising:
   computing a delta between a first temperature and a second temperature, wherein the first temperature is measured upstream of the ammonia slip catalyst and downstream of a two-way particulate filter and selective catalytic reduction device, and the second temperature measured downstream of the ammonia slip catalyst device, the ammonia slip catalyst configured to remove ammonia that has exited the two-way particulate filter and selective catalytic reduction device;
   evaluating the delta based on an efficiency threshold, wherein the delta is evaluated after regeneration of a particulate filter of the two-way particulate filter and selective catalytic reduction device occurs; and
   generating a fault notification based on the evaluating, the fault notification indicating operation of the ammonia slip catalyst.

2. The method of claim 1 further comprising receiving a first temperature signal that indicates the first temperature.

3. The method of claim 2 wherein the receiving the first temperature signal is from a temperature sensor.

4. The method of claim 1 further comprising receiving a second temperature signal that indicates the second temperature.

5. The method of claim 4 wherein the receiving the second temperature signal is from a temperature sensor disposed downstream of the ammonia slip catalyst device.

6. The method of claim 1 wherein the evaluating the delta further comprises comparing the delta to the efficiency threshold, and if the delta is greater than the efficiency threshold then setting a fault status to indicate an efficiency test pass, and if the delta is less than the efficiency threshold then setting the fault status to indicate an efficiency test fail.

7. The method of claim 1 wherein the fault notification includes a fault notification signal that is transmitted to at least one of an audio system, a warning lamp, and a telematics system.

8. The method of claim 1 wherein the fault notification includes a diagnostic code.

9. An exhaust system, comprising:
   a two-way particulate filter and selective catalytic reduction device;
   an ammonia slip catalyst device disposed downstream of the two-way particulate filter and selective catalytic reduction device that receives exhaust gas, the ammonia slip catalyst configured to remove ammonia that has exited the two-way particulate filter and selective catalytic reduction device;
   a first temperature sensor that generates a first temperature signal based on a temperature of exhaust gas before the ammonia slip catalyst and after the two-way particulate filter and selective catalytic reduction device;
   a second temperature sensor that generates a second temperature signal based on a temperature of exhaust gas after the ammonia slip catalyst; and
   an electronic control module including operative logic which when implemented that diagnoses the ammonia slip catalyst based on the first temperature signal and the second temperature signal after regeneration of the two-way particulate filter and selective catalytic device occurs.

10. The system of claim 9 wherein the control module computes a temperature delta between the first temperature signal and the second temperature signal, and wherein the control module diagnoses the ammonia slip catalyst based on the temperature delta.

11. The system of claim 10 wherein the control module sets a fault status to indicate an efficiency test pass when the temperature delta is greater than an efficiency threshold.

12. The system of claim 10 wherein the control module sets a fault status to indicate an efficiency test fail when the temperature delta is less than an efficiency threshold.

13. The system of claim 10 wherein the temperature delta indicates if a pulse of exhaust created after the regeneration has been oxidized.

14. The system of claim 9 wherein the control module generates a notification signal based on the diagnosing.

* * * * *